May 10, 1966 L. J. CRONKITE ETAL 3,250,992
SYSTEM WHICH INCLUDES MEANS FOR AUTOMATICALLY CHECKING
CONNECTIONS DURING THE WIRING OF ELECTRICAL EQUIPMENT
Filed March 30, 1962 5 Sheets-Sheet 2

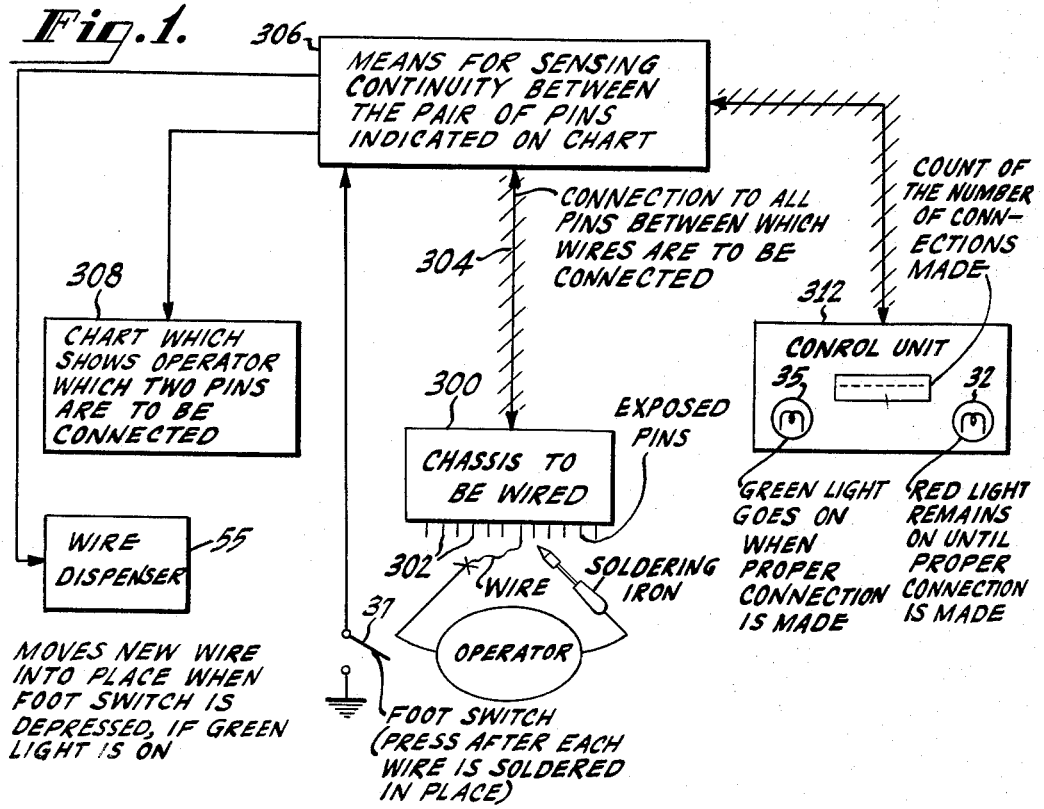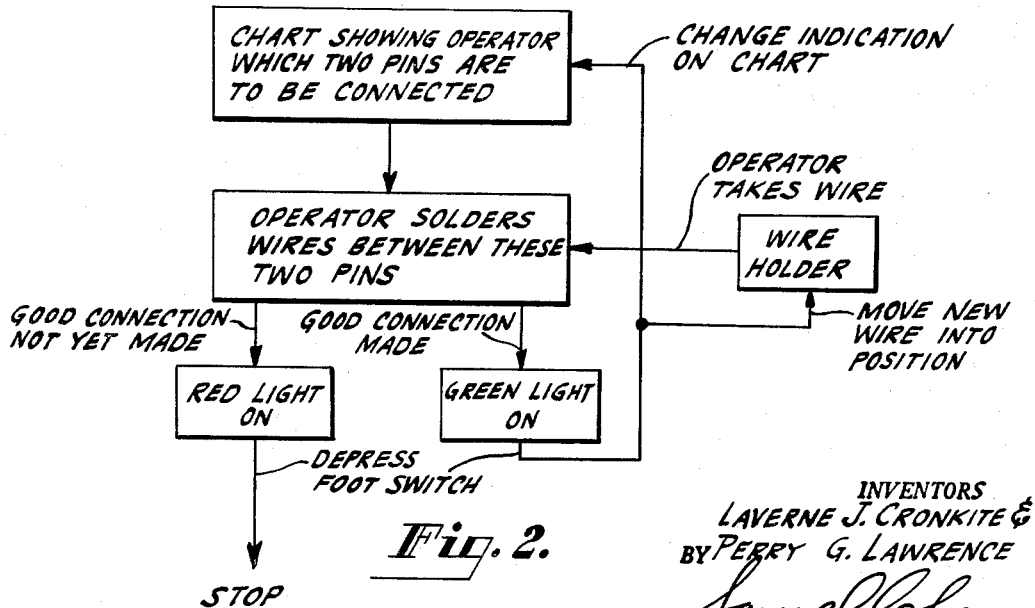

*Fig. 3a.*

INVENTORS
LAVERNE J. CRONKITE &
BY PERRY G. LAWRENCE

ATTORNEY

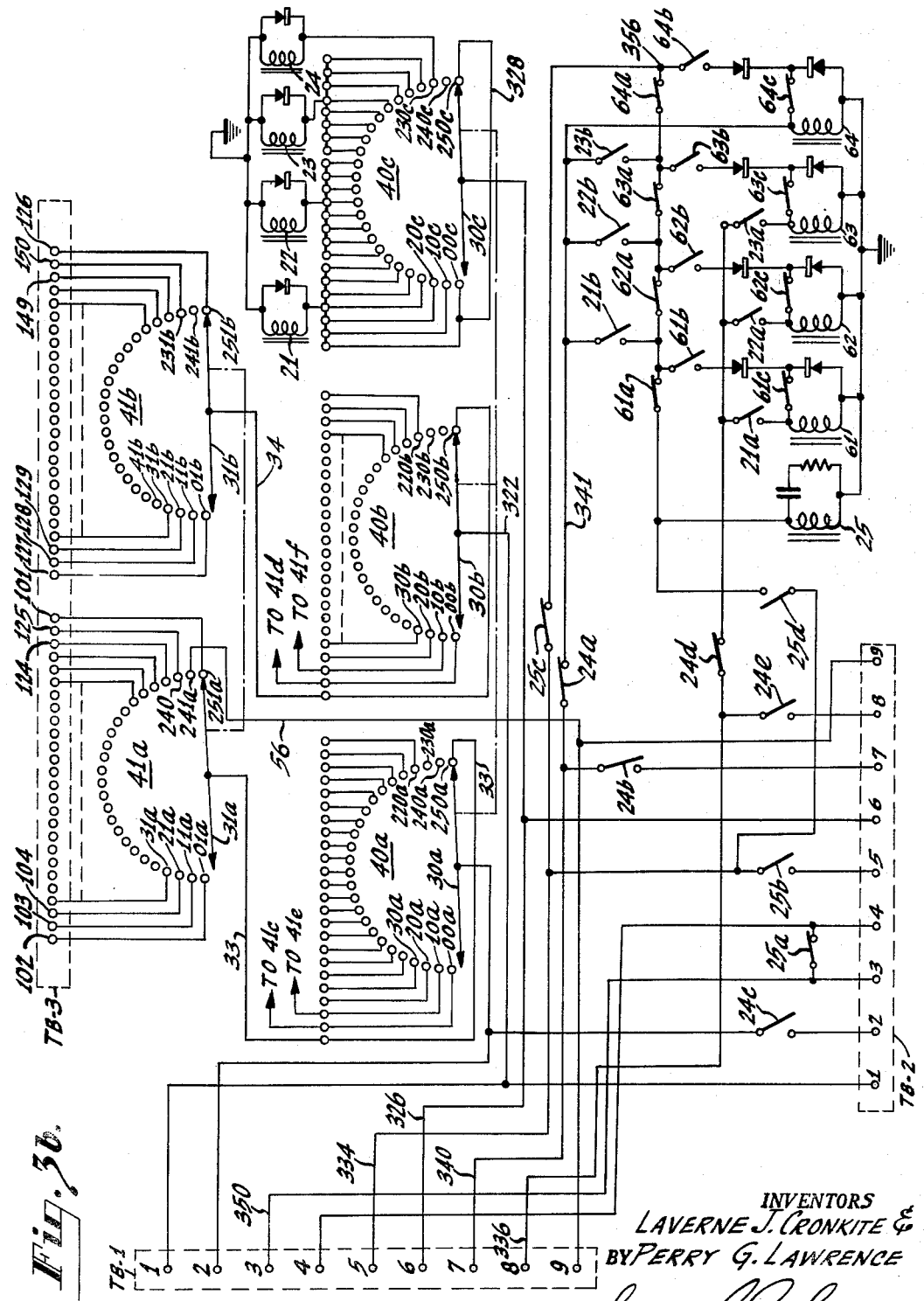

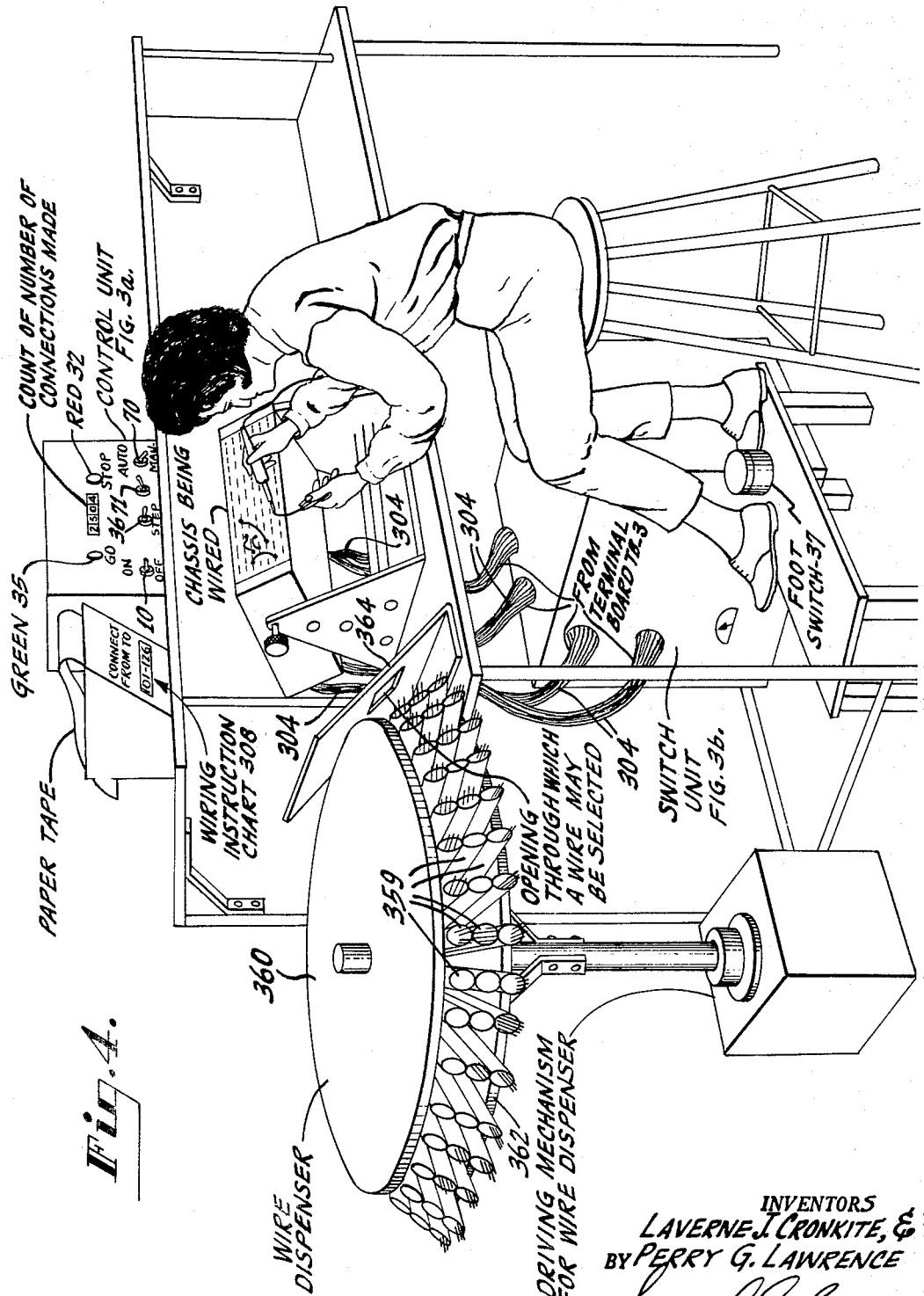

TO TERMINAL
BOARD TB-3

INVENTORS
LAVERNE J. CRONKITE &
BY PERRY G. LAWRENCE

ATTORNEY

United States Patent Office 3,250,992
Patented May 10, 1966

3,250,992
SYSTEM WHICH INCLUDES MEANS FOR AUTOMATICALLY CHECKING CONNECTIONS DURING THE WIRING OF ELECTRICAL EQUIPMENT
Laverne J. Cronkite, Canoga Park, and Perry G. Lawrence, Granada Hills, Calif., assignors to Radio Corporation of America, a corporation of Delaware
Filed Mar. 30, 1962, Ser. No. 183,893
3 Claims. (Cl. 324—66)

The present invention relates to an improved production technique for electrical equipment.

In the production of large, complex, electrical machines such as digital computers, large radar systems and so on, the many hundreds or thousands of connections which must be made inevitably lead to a certain percentage of wiring errors. These may take the form of connections between wrong terminals, cold solder joints, and so on. A considerable amount of the production cost resides in trouble shooting the equipment after it is put together and, if necessary, reworking certain areas of the equipment to eliminate the wiring errors which have occurred.

The object of the present invention is to provide a production technique which assures that proper connections are made, that is, that the right wires or other electrical elements are used and the connections are made to the proper terminals or elements and, if an error is made, to indicate that there is an error.

In the system of the present invention, a chart shows the operator the terminals between which a wiring connection is to be made. The operator makes the connection and, if it is a proper one, an indication to that effect is produced. Also, the chart display changes and indicates to the operator the next connection to be made. Further, a wire or other electrical component dispenser makes available to the operator the appropriate electrical element to be used for the next connection. If the operator has made an improper connection, the indication of a proper connection does not occur, the chart indication cannot be changed and a new electrical element can not be moved into position.

The invention is described in greater detail below and is illustrated in the following drawing of which:

FIG. 1 is a schematic showing of the present invention;

FIG. 2 is a flow chart to show the steps in the wiring operation;

Figure 5A:
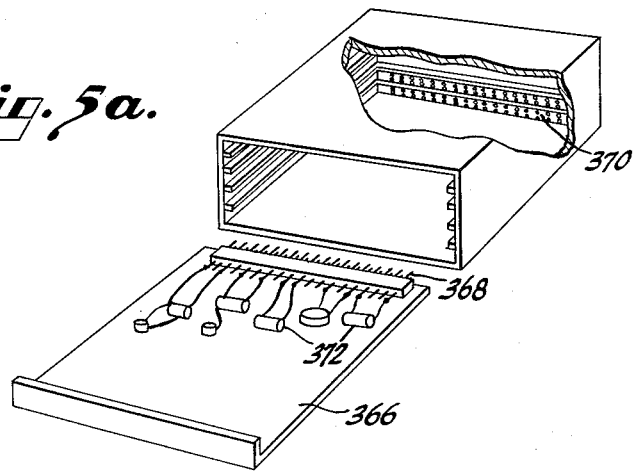
Figure 5B:
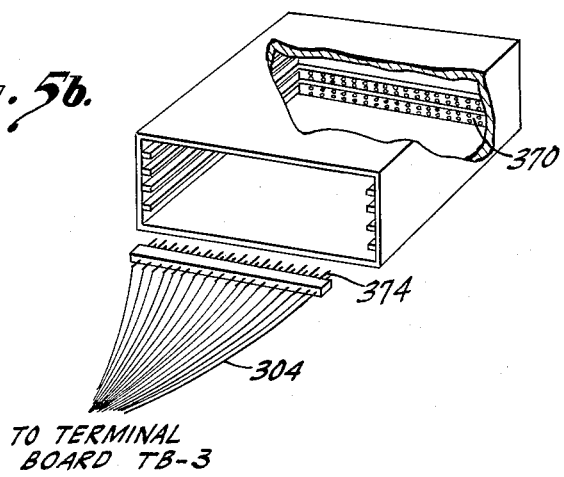
Figure 5C:
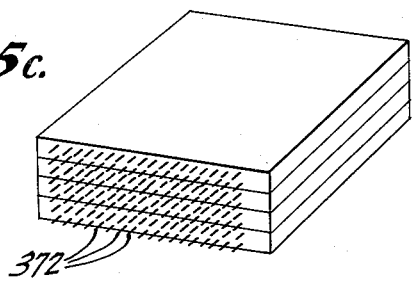

FIGS. 3a and 3b together are a schematic circuit diagram of the present invention;

FIG. 4 is a drawing showing the placement of the components of the present invention; and FIGS. 5a–5c are perspective views of a chassis, shown only as an example of application, which is adaptable to be wired according to the technique of the present invention.

FIG. 1 should be referred to first. The chassis to be wired is shown at 300. The pins or terminals 302 between which connections are to be made extend from the rear of the chassis. The particular chassis illustrated may be one of the type which receives plug boards on which transistors and other circuit elements are mounted. This type of chassis is discussed later in connection with FIG. 5. However, it is to be understood that the invention is also applicable to the wiring of cables and many other types of electrical equipments. During the wiring of the terminals 302, the plug boards are initially not in place, that is, the chassis is empty.

In the production system of embodying the invention, a plurality of cables, indicated schematically at 304, extend from block 306 into the chassis 300 to be wired. These cables may have plugs at their ends which connect to the pins 302 inside the chassis. As one example, the pins 302 may terminate in sockets and the cables 304 may terminate in plugs which engage the sockets.

The circuits in block 306 are for the purpose of sensing the continuity between different pairs of pins. As is explained in more detail later, block 306 includes various relays, stepping switches and so on which are actuated in a predetermined order so that the circuits can sense the continuity between pairs of pins in a predetermined order.

The block 308 represents an indicator chart which is controlled by the system of block 306. The indicator chart may include a window and a paper tape which moves past the window. The portion of the paper tape which can be viewed by the operator indicates the two pins between which a connection is to be made. The paper tape is driven one step at a time in synchronism with the sensing by the system 306 of a proper connection between a pair of wires.

The block 55 represents a wire dispenser. Its structure is discussed in more detail later. The function of the wire dispenser is to deliver the proper previously prepared, type and size of wire to be used for making a particular connection, and no other wire. Like the indicator chart 308, the wire dispenser is controlled by the system 306.

The control unit 312 performs a number of functions. It includes, for example, a green light and a red light. When the green light is on, it indicates that a proper connection has been made and the next pair of terminals can be wired. The red light may indicate that the connection is improper. In any case, it does indicate that the next pair of terminals cannot yet be wired for one reason or another. The control unit also includes a dial which indicates the number of connections which have been made. It also includes various manually operated switches which are not shown in FIG. 1 but which are discussed later.

The operation of the system of FIG. 1 may be more easily understood from the flow chart of FIG. 2. The operator looks at the chart 308 to find out which terminals to connect together. The wire dispenser permits her to take the wire of the proper length and thickness. She takes the wire and solders, welds, or otherwise connects it between the two terminals indicated on the indicator chart. If the connection made is good, the green light goes on. The operator then presses and releases the footswitch 37. Thereupon, the indication on the chart changes and the wire holder moves the proper wire to be used in making the next connection into position. If, on the other hand, the connection made is an improper connection, the red light 318 remains on. If the footswitch 314 should be depressed when the red light is on, the wire dispenser 55 and indicator chart 308 are not actuated. In order to obtain a green light, the operator must disconnect the wire and reconnect it in the proper way.

The system of the present invention is shown in FIGS. 3a and 3b. The terminal board TB–3 at the upper part of FIG. 3 is the one to which the cable 304 of FIG. 1 is connected. The arrangement is such that the system tests the continuity between certain pins in terminal board TB–3.

In the system of FIG. 3, two banks 41a and 41b only of a stepping switch are shown. The circuit checks the continuity between pins 101 and 126, then between 102 and 127, then between 103 and 128 and so on. With only two banks of the switch, the system can test the continuity between 25 different pairs of pins. In practice, there are actually a larger number of switch banks. For example, there are banks 41c and 41d, 41e and 41f, and so on. As these additional banks operate on the same principle as banks 41a and 41b, they are not illustrated.

It might be mentioned here that the stepping switches are known, commercially available articles. The switches include a driving mechanism coupled to a rotatable wiper(s) which successively engage fixed contacts such as 00a, 01a and so on, arranged in an arc. Driving energy for each switch is obtained from an electromagnet, such as represented by coils 61–64, which, when energized, cocks a drive spring. Upon removal of voltage, which occurs when the switch (36 or 37, FIG. 3a) is released, the spring actuates a pawl ratchet mechanism which moves the wiper to the next contact.

Cantilever contacts, actuated by the switch mechanism are used to perform auxiliary or control functions. Those operated each time the switch steps are called interrupter contacts and correspond to 61c, 62c, 63c and 64c. Those operated each time the wiper moves off its "home position" are termed "off normal" assembly contacts and correspond to 61a, b; 62a, b; 63a, b; and 64a, b. In the drawing, all switches are shown in the home position, that is, the wiper engaged with the furthest clockwise contact 251a, 251b, 250a, and so on. The principle use of the interrupter contacts is to interrupt the power to the coil and cause the switch to step under certain conditions. The off-normal contacts are used to remove power from the coils under certain conditions.

A more detailed explanation of one commercially available switch suitable for the present system may be found in C. P. Clare Co. Catalog under switch No. 202. The operation of the stepping switches is also discussed in more detail below.

To start the system of the invention, operate switch 10 shown at the upper left of FIG. 3a is closed. This permits 110 volts A.C. to be applied to the rectifier 316. The latter produces 28 volts D.C. across terminals 318, 320. Terminal 320 is connected to a convenient point of reference potential, such as ground.

28 volts is applied via leads 319 and 321, normally closed contacts 13a of relay 13, lead 322 and normally closed contacts 14a of relay 14 to red lamp 32. 28 volts D.C. is also applied via lead 324, pin 6 of terminal board TB–1 and lead 326 to the wiper 30c of stepping switch 40c. Initially, all of the stepping switches are in the position shown, that is, with their wiper in contact with the furthest clockwise terminal. In the case of switch 40c, the wiper is in contact with terminal 250c. Thus, 28 volts is applied from the wiper 30c through lead 328 to relay 21, energizing relay 21.

The 28 volts available at terminal 318 (FIG. 3a, top center) is applied to the voltage divider consisting of resistor 33 and Zener diode 34. The voltage is sufficient to cause the Zener diode to break down and to produce a relatively small voltage (about 7.5 volts) at lead 330. As is explained shortly, this voltage eventually appears at the exposed pins between which the operator is to connect wires. It is for this reason that the voltage level is reduced to this low and therefore safe level. This 7.5 volts is applied through terminal 2 of terminal board TB–1 to the wiper 30a of stepping switch 40a. From the wiper, the voltage is applied via contact 250a of the stepping switch and lead 33 to the wiper 31a of stepping switch 41a. The voltage goes from the wiper 31a, to contact 251a of switch 41a to terminal 101 of terminal board TB–3.

As previously mentioned, terminal board TB–3 is connected to a cable and plug, and the latter is adapted to plug into the chassis. The plug is in contact with the various terminals between which is desired to connect wires. The indicator chart (308, FIG. 1) at this time indicates that a connection is to be made between terminals corresponding to 101 and 126 on terminal board TB–3. When the operator makes this connection, there is a complete circuit between pins 101 and 126. Accordingly, 7.5 volts is applied from pin 126 to contact 251b of stepping switch 41b. From there, the signal goes via lead 34 through contact 250b of switch 40b to the wiper 30b of this switch. From the wiper, the voltage travels via lead 332 and pin 1 of terminal board TB–1 to relay 11 energizing this relay.

When relay 11 is energized, its contacts 11a at the upper right of FIG. 3a close. This permits 28 volts to be applied to relay 14, energizing relay 14. Now contacts 14a of relay 14 open extinguishing red light 32 and contacts 14b of relay 14 close causing green light 35 to go on.

The green light indicates to the operator that the connection just made is a correct connection. She thereupon steps on the footswitch 37 or actuates the step switch 36. These switches are essentially in parallel and serve the same purpose. The step switch is mounted on the control panel (see FIG. 4) and may, in some cases, be more convenient to use than the footswitch. If the footswitch 37 is depressed, 28 volts D.C. is applied from lead 39 through foot switch 37, through lead 50, and lead 51 to contact 204 of switch 70. The latter is a ganged switch which determines whether the system is to operate in its manual or automatic mode. With the switch arms in the lower position, as shown, operation is in the manual mode. The voltage at contact 204 is applied through now closed contacts 14c of relay 14 to terminal 8 of terminal board TB–1.

If step switch 36 is closed instead of footswitch 37, voltage is also applied to pin 8 of terminal board TB–1. However, this time the path is via lead 38, pin 213, and through step switch 36.

The voltage at pin 8 of terminal board TB–1 is applied through lead 336, normally closed contacts 24d of relay 24 and now closed contacts 21a of energized relay 21 to coil 61. Coil 61 controls the two banks 41a and 41b of the stepping switch. Each time the coil is energized and the switch (36 or 37) subsequently released, the stepping switch steps one position in the clockwise direction. Thus, the wipers 31a and 31b move from contacts 251a and 251b to contacts 01a and 01b, respectively. The movement of the stepping switches causes relays 11 and 14 to become inactivated. (The voltage is removed from wiper 31b and therefore from pin 1 of terminal board TB–1.) When relay 14 is inactivated, the red light 32 goes on, and the green light 35 goes off.

Returning now to the depression of the footswitch 37 or of the stepping switch 36, either one causes 28 volts to be applied via contact 204, now closed contacts 14c of relay 14 and lead 338 (all in FIG. 3a) to solenoid 53 when the green light is on. The circuit is completed to ground through the contact 210 of the auto-manual ganged switch 70. Each time the solenoid 53 is actuated and the switch 36 or 37 subsequently released, it causes the paper tape in the wiring chart display 308 to advance one step. In the present instance, the wiring chart display originally indicated that a connection was to be made between pins 101 and 126. The display will now indicate that the next connection is to be made between pins 102 and 127. If the footswitch or step switch is actuated when the green light is off (relay contact 14c open), the paper advance mechanism (solenoid 53 in the display 308) is not energized.

When the footswitch 37 or step switch 37 is actuated, and the green light is on (relay 14 energized), 28 volts is also applied through contacts 208 of switch 70 to relay 16 (center left of FIG. 3a). This causes relay contacts 16a (lower left of FIG. 3a) to close, and 110 volts A.C. is applied to the stepping mechanism, shown schematically at 54, of the wire dispenser 55. In practice, the stepping mechanism includes a ratchet and pawl arrangement actuated by the coil 54, which, when the switch 36 or 37 is subsequently released, cause the wire dispenser circular table to rotate through a small angle, such as 15°. (This table is shown in FIG. 4 and discussed later.) When the wire dispenser rotates, it moves a new wire into position. If the green light is off when the footswitch or step switch is depressed, relay 16 is not energized (as contact 14c is open) and the wire dispenser 55 is not actuated.

When the footswitch 37 or step switch 36 is depressed, and the green light 35 is on, 28 volts is applied from contact 204 through now closed contacts 14c of relay 14, through normally closed contacts 15a of relay 15 to the counter 52. The latter thereby advances by one. The dial on this counter therefore indicates the number of connections which have been made. If the footswitch 37 or step switch 36 is depressed when the red light is on, the open contact 14c of relay 14 prevents the 28 volts from being applied to counter 52.

Summarizing what has occurred so far, the red light on the indicator panel is on initially. The chart indicates to the operator the two terminals between which a connection is to be made. She makes the connection and a green light goes on. She thereupon steps on and then releases the footswitch. This causes the stepping switch 41a and 41b to advance one position so that the system can sense the next connection to be made. It also causes the wiring display chart to indicate the next connection to be made. It also causes the wire dispenser to move a new wire into position. It also causes the green light to go off and the red light to go on.

The procedure above is then followed for the next connection, namely 102 to 127, then 103 to 128 and so on until the connection has been made between pins 125 and 150.

After this last connection is made, the coil 61 (FIG. 3b) is energized and it rotates the wipers 31a and 31b to contacts 241a and 241b, respectively. At contact 241a the wiper 31a still receives the voltage on wiper 30a of switch 40a. This voltage is applied from contact 241a to pin 9 of terminal board 1 via lead 56. This voltage energizes relay 12 (FIG. 3a, lower right). When relay 12 energizes, its contacts 12a close and relay 15 energizes. This causes relay contacts 15a to open and 15b to close. When relay contacts 15b close, 28 volts is applied through lead 57 to pin 7 of terminal board TB-1 and from there through lead 340 and normally closed contacts 24a of relay 24 to coil 64. Coil 64 controls the stepping switch banks 40a, 40b and 40c.

When the wiper 31a of switch 41a engages contact 241a, the wiper is off its home position. Therefore, the contacts 61b are in the closed position and the contacts 61a are in the open position. It might be mentioned in passing that these contacts are operated by a cam attached to the rotating mechanism of the stepping switch. The voltage available on lead 341 therefore is applied not only to coil 64 but also through closed contacts 21b of relay 21 and closed contacts 61b and closed contacts 61c to the coil 61. The banks 41a and 41b of the stepping switch are therefore actuated and their wipers 31a and 31b move to their home positions 251a and 251b. As soon as the stepping switch 41 steps, the 7½ volts formerly applied from the wiper 31a to contact 241a is removed from the latter contact and relay 15 de-energizes.

When relay 15 is inactivated, its contacts 15b open and the voltage formerly available at pin 7 of terminal board TB-1 disappears. Therefore, the voltage at leads 340 and 341 disappears and the voltage across coil 64 is removed. Upon removal of this voltage, the mechanism associated with the coil 64 rotates the wipers 30a, 30b, and 30c, respectively, one step in the clockwise direction to contacts 00a, 00b and 00c. Contacts 15a open during the time relay 15 is energized to prevent the counter from registering an extra count during the time the banks 41a and 41b of the stepping switch are being returned to the home position.

When the stepping switch 40a and b moves to position 00a and 00b, respectively, the voltage on their wipers 30a and 30b, respectively, is applied to the respective wipers of the next banks 41c and 41d (not shown) of the switches 41. This makes it possible for the system to step through 25 additional connections. Thereupon, the stepping switch again advances one step and connects to switches 41e and 41f and so on. The number of stepping switches 41 which are required will depend in each case upon the complexity of the equipment being wired. With the system shown, each pair of banks 41a and 41b permit 25 connections to be made. Each pair of stepping switch banks such as 40a and 40b permit connections to some 24 pairs of banks corresponding to 41a and 41b. Therefore, with the two stepping switch banks 40a and 40b shown, it is possible to sense 24×25=600 different connections. Clearly, many more connections than this can be made if more switch banks are used. Additional switch units such as shown in FIG. 3b may be connected to a terminal board such as TB-2.

After switch 40c has stepped through eight different positions, relay 21 becomes inactive and relay 22 becomes energized. In these eight positions, eight pairs of stepping switches such as 41a, 41b, corresponding to 8×25= 200 connections, have been rotated through their entire range. Thereafter, the bank of relays 42 (now shown but corresponding to relay bank 41) will be stepped by the coil 62. In a similar manner, the relay 23 controls the bank of stepping switches 43 (not shown). The coil for this stepping switch is 63.

When the stepping switch 40c reaches contact 230c, relay 24 becomes energized. This permits the 7.5 volts developed across the Zener diode 34 to be applied from pin 2 of terminal board 1 through now closed contacts 24c of terminal board TB-2 to succeeding systems such as shown in FIG. 3b.

Returning to FIG. 3a, the auto-manual ganged switch 70 is shown in the lower position, that is, in the manual position. When the switch is thrown to the upper, that is, the automatic position, the actions described above proceed automatically, testing connections between successive terminals in sequence. So long as there is continuity between appropriate terminals, the switches continue to step along. However, in the automatic mode of operation the wiring chart display 303 and the wire dispenser 55 are not activated.

In more detail, in the automatic mode of operation, relays 13 and 16 act as an "automatic" step switch. As long as relays 11 and 14 are energized, 28 volts is applied through lead 39, contact 205 of ganged switch 70 and normally closed contacts 13d of relay 13 to relay 16. When relay 16 is energized, 28 volts is applied through its now closed contacts 16b to relay 13. When this occurs, the contacts 13d of relay 13 open and relay 16 de-energizes causing contacts 16b to open, thus allowing relay 13 again to become de-energized.

This cycle continues so long as each wiring connection checked is a good connection.

In the automatic mode of operation, contacts 13a of relay 13 are shorted out by the now closed contacts 213, 215 of ganged switch 70. Thus, the opening of these contacts does not interrupt the automatic operating cycle. Each time contacts 16b of relay 16 close, 28 volts is applied to contacts 14c of relay 14 in the same manner as the step switch 36 or footswitch 37 would apply this voltage in the manual mode of operation.

If, during the automatic mode of operation, an improper connection is found, relay 14 de-energizes. This causes the stepping action to stop (as relay contacts 14c open) and the red light to go on. In practice, the operator may, at the completion of the entire wiring job or at any time prior to the completion of the job, reset the equipment and then switch to the automatic mode of operation in order automatically to check all of the connections she has made.

Whenever the reset switch 71 (FIG. 3a) is depressed, 28 volts D.C. is applied to the pin 3 of terminal board TB-1. There is a connection via lead 350 and normally closed contacts 25a of relay 25 back to pin 4 of terminal board TB-1. Pin 4 is connected via lead 352 and contact 202 of the auto-manual switch 70 to relay 13. Therefore, relay 13 becomes energized opening its contacts 13a and 28 volts is held on pin 3 through the now closed contacts 13b of relay 13.

When reset switch 71 is closed, 28 volts D.C. is also applied to the reset terminal 73 of counter 52. This voltage resets the counter to its 0001 count.

When relay 13 becomes energized, its contacts 13c close. This permits 28 volts D.C. to be applied to pin 5 of terminal board TB–1. The voltage on pin 5 is applied via lead 334 and the normally closed contacts 25c of relay 25 to the junction point 356.

If stepping switch 40 (controlled by coil 64) is off the home position, contacts 64b will be closed and contacts 64a will be open. If this is the case, 28 volts D.C. is applied through the 64c contacts to the coil 64. Each time the coil is energized, the contacts 64c open causing the switch banks 40a, 40b, 40c to advance one step. This process continues until the stepping switch 40 reaches the home position at which time contacts 64b open and 64a close. Now 28 volts is applied through contact 64a and closed contacts 63b (provided stepping switch 43, which is not shown, is not in the home position) to coil 63. Coil 63 now operates until the stepping switch 43 reaches the home position and contacts 63b open and contacts 63a close. This action is repeated for stepping switch 42 (controlled by coil 62) and stepping switch 41 (controlled by coil 61).

When all stepping switches have reached their home position, 28 volts D.C. is applied from point 356 through contacts 64a, 63a, 62a and 61a to relay 25. The relay 25 becomes energized and is held energized through contacts 25d (these connect back to line 334 and terminal 5 of terminal board TB–1). Contacts 25b of relay 25 close to apply 28 volts through pin 5 of terminal board TB–2 to succeeding switch units, if any. If no succeeding switch units are applied to terminal board TB–2 or if all stepping switches in succeeding switch units are in the home position, there is no longer a path from pin 3 of terminal board TB–1 to pin 4 of terminal board TB–1 due to the fact that all of the relay contacts 25a have opened. One of these contacts is shown in FIG. 3b, however, there are similar contacts in other switch units corresponding to the one of FIG. 3b. When all of the contacts 25a have opened, relay 13 de-energizes removing 28 volts from pin 5 of terminal board TB–1. This allows relay 25 to de-energize. Contacts 13a open during the reset cycle to prevent any action to occur in the control or indicator circuits.

FIG. 4 shows the arrangement of the present invention as used in a factory production line. The wiring instruction chart 308 appears at the upper left. It consists of a roll of paper tape and a drive mechanism therefor all located in a chassis. The paper tape contains the wiring instructions. The part of the tape showing through the window indicates that a connection is to be made from pin 101 to pin 126. These numbers appear on the back of the chassis being wired next to the appropriate terminals to be wired. The drive mechanism advances the paper tape each time the footswitch 37 is depressed then released, provided that the green light is on when the switch is depressed.

Many of the circuits shown in FIG. 3a appear in the control unit which is above and directly in front of the operator. The dial of the counter 52 appears at the center of the panel. There are also visible on the panel the green and red indicator lights 35 and 32, the on-off switch 10, the step and reset switches 36 and 71, and the auto-manual switch 70.

The chassis being wired is positioned in front of the operator with the pins at the back of the chassis exposed. The circuits shown in FIG. 3b appear in the chassis legended "Switch Unit" which is located beneath the work bench. The cables 304 extend from the terminal board TB–3 in the switch unit into the chassis being wired. As is shown in more detail in FIG. 5a, these cables connect to the various pins being wired.

The wire dispenser 55 is shown at the left. It includes three rows of metal tubes 359 located between two circular members 360, 362. The tubes are filled beforehand with wires (or other electrical components) of various sizes, that is, of different lengths and thicknesses, as required for the wiring job being performed. The operator can select a wire only through the opening 364 in the metal stand 366. This opening can be manually positioned or, if desired, automatically positioned, so that it is located next to the first, second or third row of tubes. In the operation of the wire dispenser, when the green light is on, and the footswitch is depressed then released, the drive mechanism for the wire dispenser rotates the same through a small angle such as 15°. This moves a new tube into position in the window 364 and the operator then removes the next wire to be soldered into position.

FIGS. 5a–5c show in greater detail a type of chassis which is particularly appropriate for the production technique just described. In FIG. 5a, the open end of the chassis faces the viewer. The chassis is formed with channels along its edges. Units known as "plug boards," such as shown schematically at 366, slide into the channels. Each plug board has a terminal strip at its end in which prongs 368 are imbedded. These engage sockets 370 at the rear of the chassis. The plug board itself may be made of a sheet of insulating material on which are mounted various electrical components as indicated schematically at 372. These may include transistors, resistors, and the like and may be interconnected by printed circuits. A rear view of the chassis of FIG. 5a appears in FIG. 5c. The terminals 372 which correspond to the sockets 370 are shown extending from the rear of the chassis. It is between these terminals that the operator must connect various wires.

In the production technique of the present invention, during the wiring of the chassis, the plug boards are not in place in the chassis. Instead, a group of prongs 374 corresponding to the prongs 368 are connected into the sockets 370. Although only one such group of prongs 374 are shown, in practice, there will be one group of prongs connected to each of the sockets so that all sockets in the chassis are filled. These prongs lead back to the terminal board TB–3 through cables such as 358.

In the embodiment of the invention illustrated in FIGS. 3a and 3b, all stepping switch coils and most of the relay coils have diodes across them. Their purpose is to absorb the collapsing field when the relay is de-energized. This reduces arcing at relay contacts. Relays 13, 16 and 25 have a resistor and capacitor network across the coil to provide a slight time delay when the relay is de-energized. The values of resistors and capacitors are not critical but should be such as to cause a suitable time delay for operation.

What is claimed is:

1. In a system for aiding an operator to connect electrical elements between terminals of a piece of electrical equipment, in combination, an indicator chart which shows the ones of the terminals between which a connection is to be made;

a dispenser which includes a plurality of movable containers of elements suitable for connection between the different terminals, and which includes an opening accessible to the operator with respect to which the containers can be moved and through which access only to one of the containers is possible; and sensing means which normally maintains the containers of a dispenser stationary and responsive to the making of a proper connection between a pair of terminals for permitting the containers to move to a new position such that an element suitable for the next connection is accessible to the operator.

2. In a system for assisting one to connect appropriate electrical elements between selected ones of a group of terminals, in combination, an indicator chart for indicating, in sequence, the terminals between which elements are to be connected; an electrical element dispenser for providing elements to be placed between pairs of terminals; a sensing circuit electrically coupled to said terminals for sensing that an element taken from the dispenser has been properly connected between two terminals and for producing an indication in response thereto; an advance circuit for actuating said dispenser after a connection has been made for causing the dispenser to provide the element to be placed between the next pair of terminals to be connected and for actuating said indicator chart; a switch in said advance circuit for operating said circuit; and means responsive to the absence of said indication for preventing the advance circuit from being actuated by said switch and for preventing said indicator chart from being advanced, and responsive to the presence of said indication and to the operation of said switch for changing the indication on said indicator chart to that of the next terminals between which a connection is to be made and for actuating said dispenser.

3. In a system for aiding an operator to connect proper electrical elements between terminals of a piece of electrical equipment, in combination, an indicator chart for indicating, in sequence, the terminals between which elements are to be connected; a dispenser for providing, in sequence, the successive elements to be used in making the successive connections, respectively; sensing means electricaly coupled to said terminals for producing an output signal each time the connection of an element between terminals has been properly made; a manually operated switch; means responsive to the concurrent receipt of a signal indicative of a proper connection, from said sensing means and the actuation of said switch for changing the indcation on said indicator chart to that of the next terminals between which an element is to be connected, and for causing said dispenser to provide the element to be used in making said next connection; and means responsive to absence of said signal for preventing the switch from changing the indication on the indicator chart and for preventing the switch from actuating said dispenser.

References Cited by the Examiner
UNITED STATES PATENTS

| | | | |
|---|---|---|---|
| 2,637,096 | 5/1953 | Luhn | 324—66 X |
| 2,953,744 | 9/1960 | Miller et al. | 324—66 |
| 3,052,842 | 7/1962 | Frohman et al. | 324—73 |

WALTER L. CARLSON, *Primary Examiner.*

J. P. O'BRIEN, W. H. BUCKLER, *Assistant Examiners.*